United States Patent [19]

Hrysko

[11] Patent Number: 4,799,845
[45] Date of Patent: Jan. 24, 1989

[54] MEANS FOR ATTACHING SHEET MATERIAL TO A SUBSTRATE

[75] Inventor: Paul W. Hrysko, Ancaster, Canada

[73] Assignee: Dunlop Construction Products Inc., Canada

[21] Appl. No.: 50,673

[22] Filed: May 18, 1987

[30] Foreign Application Priority Data

May 16, 1986 [GB] United Kingdom ............... 8612003

[51] Int. Cl.⁴ .............................................. F16B 43/02
[52] U.S. Cl. .................................. 411/542; 411/544; 411/908; 52/410
[58] Field of Search ............. 411/368, 369, 531, 533, 411/542, 544, 537, 512, 908, 371–373; 52/410, 512, 747

[56] References Cited

U.S. PATENT DOCUMENTS

| | | | |
|---|---|---|---|
| 3,191,730 | 6/1965 | Fischer | 411/542 |
| 4,293,243 | 10/1981 | Graybeal et al. | 411/373 |
| 4,455,804 | 6/1984 | Francovitch | 52/512 |
| 4,467,581 | 8/1984 | Francovitch | 52/410 |
| 4,476,660 | 10/1984 | Francovitch | 411/542 |
| 4,627,207 | 12/1986 | Young et al. | 52/515 |
| 4,630,422 | 12/1986 | Beneze | 52/410 |
| 4,686,808 | 8/1987 | Triplett | 52/512 |

FOREIGN PATENT DOCUMENTS 947816 1/1964 United Kingdom ............... 411/542

*Primary Examiner*—Neill R. Wilson
*Attorney, Agent, or Firm*—Stevens, Davis, Miller & Mosher

[57] ABSTRACT

A fastening disk for use in attaching sheet material to a substrate, comprising:
(a) a disk plate with a substantially discoid concave proximal surface for positioning facing the sheet material to be attached,
(b) concentric inner and outer tubular posts extending from the distal surface of the disk plate,
(c) radial struts connecting the inner and outer posts, and
(d) radial vanes on the distal surface of the disk plate between the outer post and the periphery of the disk plate, the disk being compressible to reduce the concavity of the disk plate.

Also, means for attaching sheet material to a substrate comprising said fastening disk, a pliable gasket for positioning between the proximal surface of the disk plate and the sheet material, and a compression/retention means for insertion in the inner post of the disk, through the gasket and into the substrate, such that tightening of the compression/retention means towards the substrate applies a compressive force on the disk to reduce the concavity thereof and retains the disk/gasket/sheet assembly attached to the substrate.

Preferred use is in attaching single ply weather-proofing membrane to a roof deck.

19 Claims, 3 Drawing Sheets

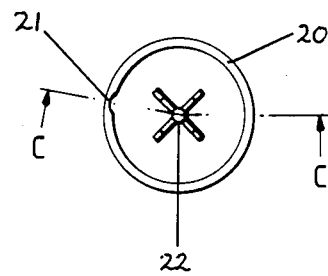
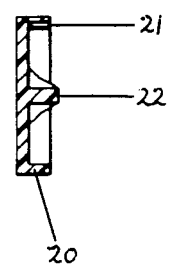
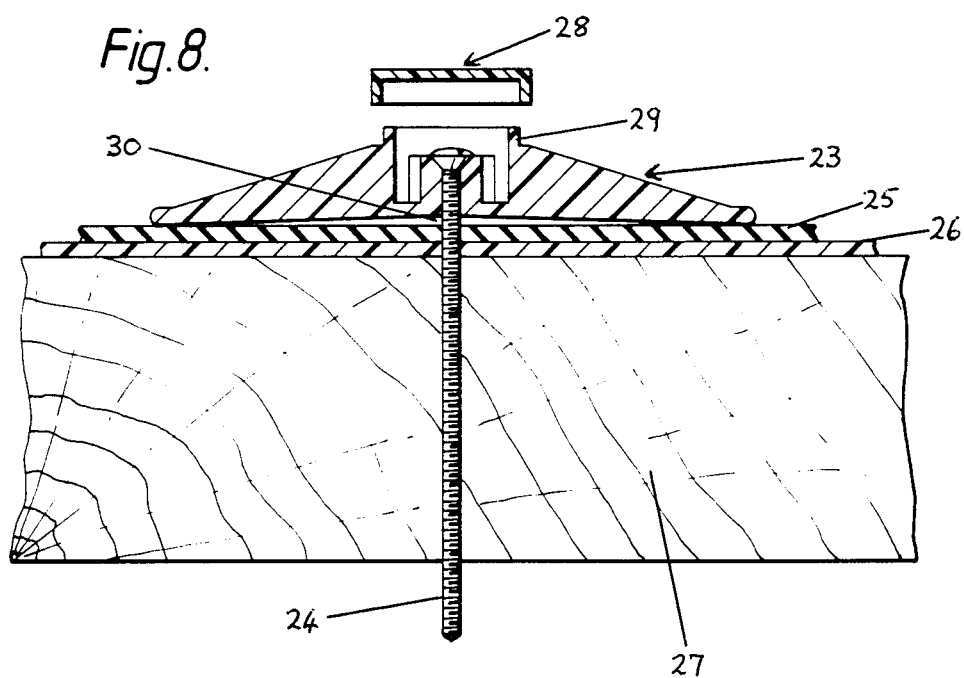

MEANS FOR ATTACHING SHEET MATERIAL TO A SUBSTRATE

This invention relates to means for attaching sheet material to a substrate and especially to means for attaching weatherproof sheeting to the deck of a roof or the like.

It is known to use large sheets of material such as plastics or elastomer as the basic weatherproofing element on substrates such as roof decks. The sheets should be fixed to the substrate by means which minimise the risk of damage during fixing and the risk of damage and detachment under environmental conditions such as the weather and people walking on the surface. Various fixing systems have been proposed or used. A simple known fixing system comprises covering the laid sheets with chippings or slabs of natural or synthetic stone-like ballasting material but this system has the limitations that usually it is suitable only for substantially horizontal substrates and for substrates capable of supporting the weight of the ballast. Another fixing system comprises adhering the sheets to the substrate but this system has the limitations of requiring a substantially uniform and adhesive-compatible substrate. It is also known to employ mechanical fixing systems, for example plates or bars, typically of metal, which hold the sheets on the substrate by means of screws through the assembly, but it is found that these tend to move the sheets out of the plane of the substrate and/or place undesirable stress on the sheets which eventually can lead to damage and leakage under severe weather conditions.

There is now devised a means for attaching sheet material, especially weatherproofing sheeting, to a substrate, especially the deck of a roof or the like, which is simple and quick to employ without damage to or undesirable stress on the sheet material and which provides a long-term stable covering under extreme weather conditions.

According to the present invention there is provided a fastening disk for use in attaching sheet material to a substrate, comprising (a) a disk plate with a substantially discoid concave proximal surface for positioning facing the sheet material to be attached, (b) concentric inner and outer tubular posts extending from the distal surface of the disk plate, (c) radial struts connecting the inner and outer posts, and (d) radial vanes on the distal surface of the disk plate between the outer post and the periphery of the disk plate, the disk being compressible to reduce the concavity of the disk plate.

According to the present invention also there is provided means for attaching sheet material to a substrate, comprising a fastening disk as defined in the immediately preceding paragraph, a pliable gasket for positioning between the proximal surface of the disk and the sheet material, and a compression/retention means for insertion in the inner post of the disk, through the gasket and into the substrate, such that tightening of the compression/retention means towards the substrate applies a compressive force on the disk to reduce the concavity thereof and retains the compressed disk/gasket/sheet material assembly attached to the substrate.

The disk plate preferably is made of a tough flexible weather-resistant material, especially a material having good low-temperature stability. The choice of material should enable the concavity of the proximal surface of the disk plate to be reduced towards a flattened state and to give a positive seal with an underlying surface on application of a compressive force to the disk by a compression/retention means. Preferably the flexibility of the disk plate is on the low side such that a secure attachment of the sheet material to the substrate is achieved when the concavity of the disk is reduced less than completely, for example at a 50% reduction of concavity. A preferred flexibility is that typified by acrylonitrile/butadiene/styrene resin (ABS). Accordingly a preferred disk plate material is a synthetic resin such as ABS, although other materials such as metal may also be used.

Preferably the proximal surface of the disk in the unstressed (uncompressed) state is concave to only a small extent, for instance the angle between the proximal surface and the peripheral plane at the periphery of the disk plate may be up to 15 degrees, preferably up to 10 degrees, for instance in the range 1 to 5 degrees. The concavity may be substantially conically shaped or substantially dome shaped. An example of the distance of the centre of the proximal surface of the disk plate perpendicularly from the plane of the periphery of the plate is of the order of one-sixteenth of an inch for an approximately 4-inch diameter plate.

The disk plate may have an aperture at the position of the inner post, especially when the material of the plate is of tough material such as ABS, for the accommodation of a compression/retention means. Preferably the diameter of the aperture corresponds with the bore of the inner post. Apart from such an aperture, suitably the plate is aperture-free.

A preferred, advantageous, embodiment is wherein the proximal surface of the disk plate has concentric or spiral grooves, especially over the radially outer portion of the surface and suitably over most of or substantially the entire surface. It is found that such grooves inhibit undesirable extrusion of a gasket material from beneath the disk when it is compressed. An example of a suitable groove depth is up to about 0.01 inch, for instance from about 0.003 to about 0.004 inch.

The disk plate diameter may be selected according to the particular sheet material, substrate and other conditions of use. For general use the disk may have a plate diameter of, for instance, about 4 inches.

The vanes of the disk preferably are integral with the disk plate and suitably are attached continuously to the plate from a position at or near to the plate periphery to a position at or near to the outer post. Preferably the vanes are attached to the outer post and the outer post may be thicker at the vane-attachment portion. The vane dimensions and number should be such as to allow the disk plate to flex on compression. Suitably the vanes taper in height from the outer post towards the plate periphery. The general shape of the disk with tapering vanes may be described as being substantially conical. The height of the vanes at their termination nearest to the plate periphery preferably is zero and these termination points may be substantially pointed, flat-edged or rounded. The vanes may have flat, sharp or rounded top edges and may be of substantially uniform thickness or, more usually, may become thicker perpendicularly towards the distal surface of the plate, for example thickening from about one-eighth of an inch at or near the top edge to about three-sixteenths or one-quarter of an inch at the distal surface of the plate. Usually the vanes merge smoothly with the distal surface of the plate.

Preferably the vanes are equidistantly spaced. The number of vanes may be various, for instance 4 or 8. The main purpose of the vanes are to strengthen the disk and preferably to prevent the proximal surface of the disk plate from becoming completely flattened if the compression/retention means is overtorqued, which is important to minimize the risk of extrusion of a gasket material from beneath the disk and to produce a stable attachment.

The tubular posts typically are positioned centrally about the central axis of the disk and preferably both posts are integral with the disk plate. The inner post may be of lesser height than the outer post, from the disk plate. The upper portion of the outer post may be free of vane attachment and may be adapted for accommodating a cap to close its top end. The inner post is for accommodating a compression/retention means, for example a screw or bolt. Preferably the bore (diameter) of the inner post is similar to or slightly larger than the shaft diameter of the compression/retention means. The inner wall surface of the inner post may be substantially smooth or may be threaded to complement the thread of a screw or bolt compression/retention means. Preferably the disk plate has a preformed aperture substantially corresponding to the bore of the inner post but, if desired, the inner post may be close-ended at the disk plate and an aperture may be bored through the closed end by a screw compression/retention means during employment of the disk. The inner post preferably is adapted to take the compressive force required to compress and retain the disk when employed to attach a sheet material to a substrate. The top end of the inner post may be shaped to complement the contact surface of the head of the compression/retention means, for instance it may have an internal annular bevel to complement a bevel on the underside of the head of a screw or bolt. The wall thicknesses of the posts are not critical provided that the desired compression of the disk plate can be achieved in use of the disk. An example of an inner post wall thickness is about three-thirtyseconds of an inch and an example of an outer post wall thickness at the portion to which the vanes are attached is about one-eighth of an inch.

The inner and outer posts are connected by radial struts. The struts provide advantageous flexibility and durability which are not achieved by means of a solid core. Typically the struts are integral with both posts. Preferably the struts extend substantially the entire length of the inner post. Preferably the struts are equidistantly spaced. The number of struts may be, for example, 3 to 8. The strut thickness may be substantially uniform or it may increase slightly towards the disk plate. Such an increasing strut thickness may confer advantages. For an 8-strut, 8-vaned, 4-inch diameter disk, the mean strut thickness may be, for instance, about one-sixteenth of an inch.

The disk may be employed with a cap to cover at least the position for accommodating the head of the compression/ retention means after the disk has been attached, and for this purpose the upper (distal) sie of the disk may be adapted for fitment of such a cap. The cap may have an annular downwardly projecting flange (which may be continuous or discontinuous) sized to fit onto a complementary upwardly projecting flange on the disk, such as by a push-fit or screw-threaded connection. The disk flange may be formed on or by the upper portion of the outer post. When the cap flange is continuous and for a push-fit connection, the inner surface of the flange may have one or more depressions extending from the flange periphery to allow air to escape during push-fitting of the cap. If desired, the cap may be further secured to the disk by bonding the flanges together, for instance by means of an adhesive composition or solvent-welding, after the disk has been attached by the compression/retention means.

In a preferred embodiment, the cap has an internal central lug having a shape to mate with the head of the compression/retention means, for instance a phillips head shaped lug to fit into the corresponding phillips cross-slotted head of a screw or bolt compression/retention means, and thereby to inhibit the tendency of the compression/retention means to unscrew under the forces of vibration of the substrate. If desired, the cap having such a lug may be used to insert the screw or bolt compression/retention means.

Preferably the disk is of integral construction. It may be produced by moulding, for example by injection moulding. The cap also may be produced by moulding and may be formed of the same material as the disk and in a single moulding operation with the disk, being thus connected to the disk normally by a breakable connection, for example connected to the disk plate substantially in the plane thereof.

In attaching sheet material to a substrate, the disk is particularly suitable for use with a pliable gasket positioned between the disk and the sheet material which is to be attached to the substrate. The pliability of the gasket preferably does not diminish with time in the environment of use of the assembly and preferably should allow small movements of the sheet material after attachment to the substrate, such as movements normally caused by environmental temperature fluctuations and building stresses.

The gasket suitably is based on an elastomeric material which may be curable (vulcanizable) or non-curable. Preferably the gasket comprises a tacky material, at least at the time of application, so that the surface of the gasket is forced into the concavity of the proximal surface of the disk plate, and into the grooves thereof when present, during attachment of the disk, in order to produce a strong seal with the disk. An example of a curable gasket material is one which cures slowly under the environmental conditions encountered on roofs and other construction sites. Such a material may require 3 days at 160 degrees F. to attain complete cure. Suitably it should have a very high initial tack, for example an initial peel strength in the range 5 to 15 lb, and preferably the peel strength should increase on curing. However, a preferred gasket material is a non-curable elastomer since this obviates the need for a setting/curing time. The gasket preferably should produce a primary seal between the disk and the sheet material and accordingly the gasket material should be compatible with, i.e. it should adhere to, the materials of the proximal surface of the disk plate and the sheet. A preferred gasket is one based on a tacky butyl rubber since this may react with an ABS disk plate surface to produce a strong bond. A suitable gasket material is that available under the trade name "DUNSEAL".

One method of making the gaskets is to produce a large sheet of the gasket material of desired thickness, for instance by extrusion, which may be collected as a roll with the adjacent surfaces separated by a release sheet, and then to cut or stamp the sheet to produce flat discs or other sections of dimensions greater than the circumference of the proximal surface of the disk plate.

As an alternative to the use of an individual gasket for each disk, the gasket may be in the form of a tape for assembly with several disks.

The gasket may be pre-applied to the disk to form a unitary element or it may be applied between the disk and the sheet material on site. If desired, it may have a preformed hole to accommodate the compression/retention means passing through the bore hole of the disk, but usually this is not necessary. In use, as the disk is compressed by the compression/retention means, the gasket material tends to flow towards the centre of the proximal surface of the disk, thereby expelling air from the disk concavity and forming a tight seal.

The torque applied to the compression/retention means should be controlled to retain some concavity of the disk after compression and to avoid undesirable stress on the disk/gasket/ sheet/substrate assembly. A suitable reduction of a one-sixteenth inch deep concavity for a 4-inch diameter ABS disk plate is about 50%, i.e. to about one-thirtysecond of an inch, and to this end a suitable torque is about 40 to 50 ft.lb. Typically, the compression/retention means is a screw having a shank sized to minimize stress on the posts of the disk. Preferably the screw has a diameter (i.e. thickness of the shank body plus half the thread depth) which is substantially the same as the bore of the inner post. For a 4-inch AS disk, an example of a suitable screw size is No. 14. The length of the screw should be such as to achieve the desired strength of attachment of the elements of the assembly and obviously will depend on the thickness of the sheet material and gasket, the disk height and the nature of the substrate.

Preferably, after the sheet material has been attached to the substrate by means of the disk, gasket and compression/retention means, the attachment is further weather-proofed by means of a cap fitted over a least the otherwise exposed head of the compression/retention means, as hereinbefore referred to. Alternatively to the use of such a cap, the head of the compression/retention means may be protected by, for example, bonding a simple cover, e.g. a plastics disc, to the top of at least one of the disk posts or applying a paste of a protective composition, e.g. a bitumastic composition, to cover at least the head of the compression/retention means.

The disk, gasket and compression/retention means are particularly suitable for attaching sheet materials, often referred to as membranes, to substrate to provide weather-proofing, especially on roofs of buildings. Currently preferred sheet materials are those of EPDM or chlorinated polyethylene such as that available under the trade name "HYPALON", and such sheet materials currently are often employed in single ply. The present invention is suitable for use with such sheet materials. The substrate to which the sheet material is to be attached may be of various materials and structure and the present invention is suitable for providing a weather-proof surface on horizontal, inclined, shaped, continuous and discontinuous substrates. The spacing of the attachment means obviously should be such as to prevent lifting of the sheet material and leakage at the joints between adjacent sheets. The invention is suitable for use in both original surfacing and resurfacing.

The invention is illustrated, by way of example, in the accompanying drawings in which:

FIG. 6 shows the plan view of the inside of one form of a cap for use with a fastening disk in accordance with the invention;

FIG. 7 shows the vertical cross-sectional view of the cap along the line C—C of FIG. 6;

FIG. 8 shows the vertical cross-sectional view of an assembly of a fastening disk, a gasket, a sheet material, a compression/retention means, a substrate and (remotely illustrated) a cap, in accordance with the invention.

Figure 1:
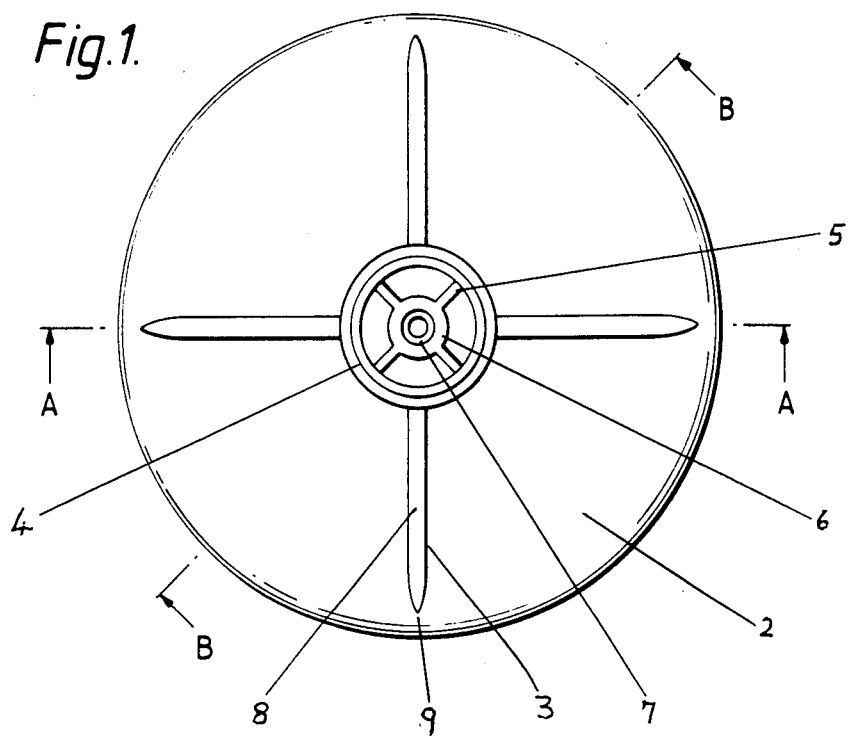
FIG. 1 shows the top plan view of one form of a fastening disk according to the invention.
Figure 2:
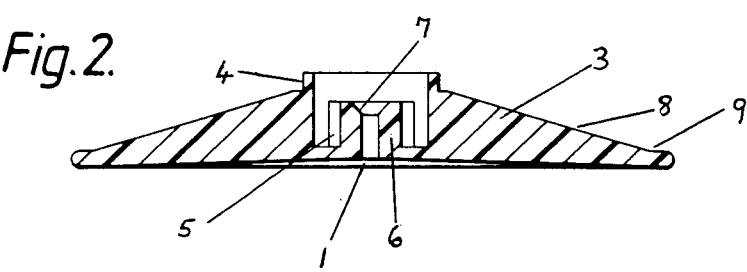
FIG. 2 shows the vertical cross-sectional view of the disk along the line A—A of FIG. 1.
Figure 3:
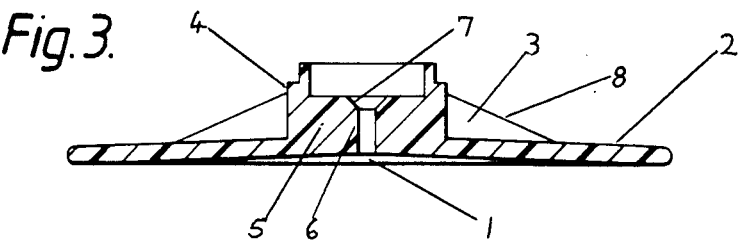
FIG. 3 shows the vertical cross-sectional view of the disk along the line B—B of FIG. 1.

The fastening disk shown in FIGS. 1 to 3 is an integral device comprising a disk plate having a slightly concave proximal surface 1 and a distal surface 2 on which there are four vanes 3 extending radially from an outer tubular post 4 which is connected via four radial struts 5 to an inner tubular post 6 having a bevel 7 at its top end. The vanes 3 have substantially sharply rounded top edges 8 and substantially pointed termination points 9, and are of substantially uniform thickness.

Figure 4:
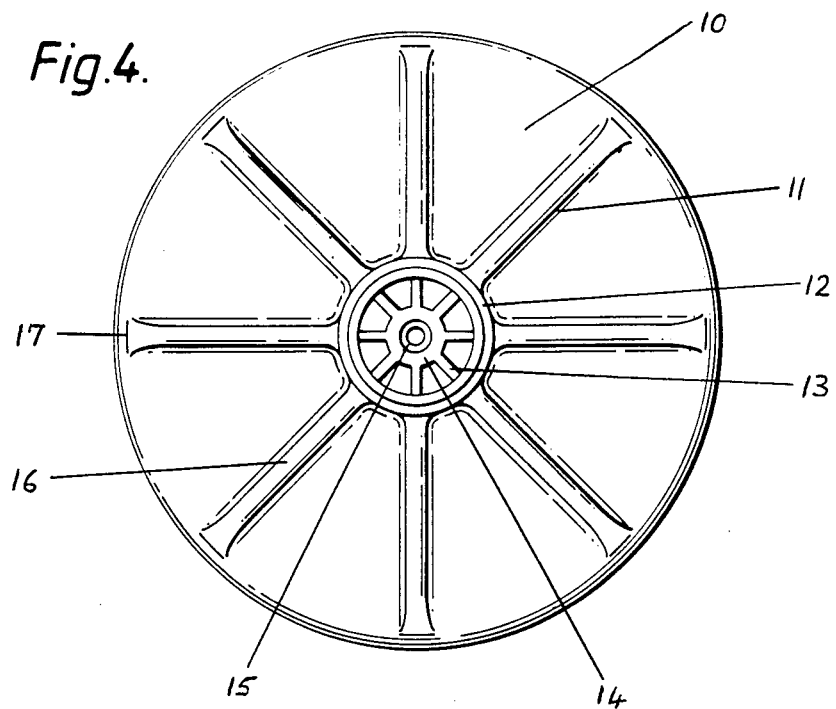
FIG. 4 shows the top plan view of an alternative form of a fastening disk according to the invention.

The alternative fastening disk shown in FIG. 4 is an integral device comprising a disk plate having a slightly concave proximal surface (not shown) and a distal surface 10 on which there are eight vanes 11 extending radially from an outer tubular post 12 which is connected via eight radial struts 13 to an inner tubular post 14 having a bevel 15 at its top end. The struts 13 become slightly thicker towards the disk plate. The vanes 11 have substantially flat top edges 16 and substantially flat-edged termination points 17. The vanes 11 become slightly thicker perpendicularly towards the distal surface 10 of the plate and merge smoothly with it. The heights of the inner and outer posts 12 and 14 are similar to those of the posts 4 and 6 of FIGS. 1 to 3.

Figure 5:
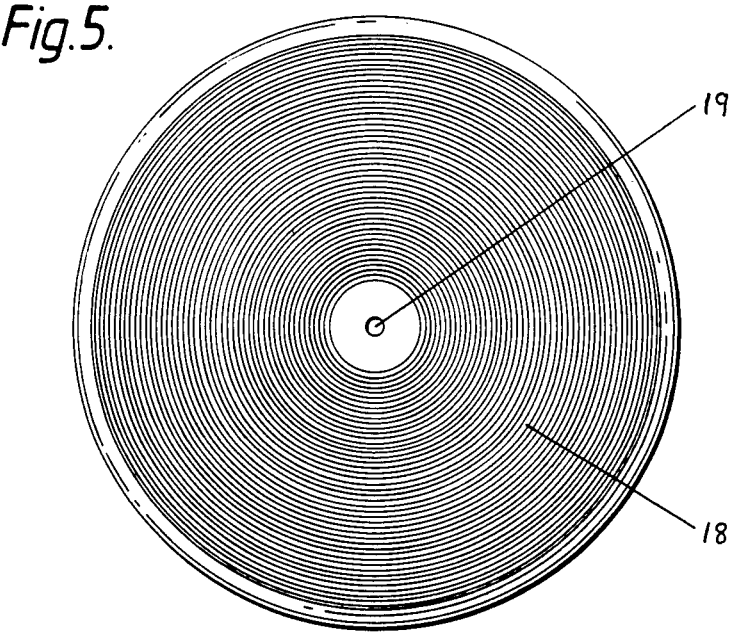
FIG. 5 shows the bottom plan view of one form of the disk plate of a fastening disk according to the invention.

FIG. 5 shows a proximal surface of a fastening disk, for instance a disk as shown in FIGS. 1 to 3 or 4, having concentric grooves 18 and an aperture 19 at the position of, and corresponding with the bore of, the inner post.

The cap shown in FIGS. 6 and 7 has an annular flange 20 having an inner surface depression 21 and has a central lug 22 in the shape of a tapering cross-head (e.g. a phillips head) for fitting into a corresponding cross-slotted head of a screw or bolt compression/retention means.

FIG. 8 shows an assembly of a fastening disk 23 such as that of FIGS. 1 to 3, a screw compression/retention means 24, a pliable gasket 25 such as of non-curable tacky elastomer, a single ply roofing membrane 26 such as of EPDM and a wooden deck substrate 27, and shows a simple cap 28 sized to fit onto the upstanding flange 29 of the outer post of the disk. The concavity 30 of the proximal surface of the disk plate is reduced, for instance by about 50%, under the compressive force of the screw compression/retention means 24.

I claim:
1. A fastening disk for use in attaching sheet material to a substrate, comprising
   (a) a disk plate with a substantially discoid concave proximal surface for positioning facing the sheet material to be attached,

(b) concentric inner and outer tubular posts extending from the distal surface of the disk plate, (c) radial struts connecting the inner and outer posts, and (d) radial vanes on the distal surface of the disk plate between the outer post and the periphery of the disk plate, the disk being compressible to reduce the concavity of the disk plate.

2. A disk according to claim 1 which is of integral construction.

3. A disk according to claim 2 wherein, in its unstressed state, the angle at the periphery of the plate between the proximal surface and the periphery plane is up to 15 degrees.

4. A disk according to claim 3 wherein said angle is in the range of 1 to 5 degrees.

5. A disk according to claim 2 having a disk plate diameter of about 4 inches and wherein the distance of the center of the proximal surface perpendicularly from the plane of the periphery of the disk plate is about one-sixteenth of an inch.

6. A disk according to claim 1 having an aperture at the position of the inner post.

7. A disk according to claim 1 wherein the proximal surface has concentric or spiral grooves of a depth up to about 0.01 inch.

8. A disk according to claim 1 wherein the vanes are attached continuously to the disk plate and to the outer post and taper in height towards the plate periphery.

9. A disk according to claim 1 wherein the vanes are equidistantly spaced.

10. A disk according to claim 1 having 4 to 8 vanes.

11. A disk according to claim 1 wherein the inner post is of lesser height than the outer post and wherein the upper portion of the outer post is free of vane attachment and is adapted for accommodating a cap to close its top end.

12. A disk according to claim 1 wherein the struts extend along substantially the entire length of the inner post.

13. A disk according to claim 1 wherein the struts are equidistantly spaced.

14. A disk according to claim 1 having 3 to 8 struts.

15. A disk according to claim 1 of acrylonitrile/butadiene/styrene resin.

16. Means for attaching sheet material to a substrate, comprising a fastening disk as defined in claim 1, a pliable gasket for positioning between the proximal surface of the disk and the sheet material, and a compression/retention means for insertion in the inner post of the disk, through the gasket and into the substrate, such that tightening of the compression/retention means towards the substrate applies a compressive force on the disk to reduce the concavity thereof and retains the compressed disk/gasket/sheet material assembly attached to the substrate.

17. Means according to claim 16 wherein the gasket is based on a non-curable tacky elastomeric material.

18. Means according to claim 16 further comprising a cap to cover the head of the compression/retention means, said cap having an annular downwardly projecting flange sized to fit onto a complementary upwardly projecting flange formed on the upper portion of the outer post of the disk and additionally having an internal lug of shape to mate with the head of the compression/retention means.

19. Method of attaching a weather-proofing membrane to a roof deck comprising assembling a fastening disk defined in claim 1 with a pliable gasket between the proximal surface of the disk and the membrane on the roof deck, inserting the shank of a headed-shank compression/retention means through the bore of the inner tubular post of the disk, the underlying gasket and the membrane and to penetrate the roof deck, and applying a compressive force on the disk by tightening the compression/retention means towards the roof deck such that the concavity of the disk is reduced and such that some concavity of the disk is retained in the final attached assembly.

* * * * *

UNITED STATES PATENT AND TRADEMARK OFFICE
CERTIFICATE OF CORRECTION

PATENT NO. : 4,799,845

DATED : January 24, 1989

INVENTOR(S) : Paul Walter HRYSKO

It is certified that error appears in the above-identified patent and that said Letters Patent is hereby corrected as shown below:

Column 3, line 60, "sie" should read -- side --.

Column 5, line 26, "AS" should read -- ABS --.

Column 5, line 36, "a least" should read -- at least --.

Column 5, line 48, "substrate" should read --substrates --.

Column 7, line 13, "periphery" should read -- peripheral --.

Signed and Sealed this

Eighth Day of May, 1990

*Attest:*

HARRY F. MANBECK, JR.

*Attesting Officer*    *Commissioner of Patents and Trademarks*